United States Patent
Ertel et al.

(10) Patent No.: US 7,189,972 B2
(45) Date of Patent: Mar. 13, 2007

(54) X-RAY DETECTOR WITH IMPACT ABSORBING COVER

(75) Inventors: Jason R. Ertel, Waukesha, WI (US); Richard Aufrichtig, Mountain View, CA (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 10/711,763

(22) Filed: Oct. 4, 2004

(65) Prior Publication Data

US 2006/0071172 A1   Apr. 6, 2006

(51) Int. Cl.
*G01T 1/24*   (2006.01)

(52) U.S. Cl. .............................. 250/370.11; 250/370.09

(58) Field of Classification Search ........... 250/370.09, 250/370.11, 515.1, 580; 378/189
See application file for complete search history.

(56) References Cited

U.S. PATENT DOCUMENTS

| | | | |
|---|---|---|---|
| 5,103,092 A | 4/1992 | Takahashi et al. | |
| 5,262,871 A | 11/1993 | Wilder et al. | |
| 5,281,803 A | 1/1994 | Ishizuka | |
| 5,508,740 A | 4/1996 | Miyaguchi et al. | |
| 5,514,873 A | 5/1996 | Schulze-Ganzlin et al. | |
| 5,608,774 A | 3/1997 | Polichar et al. | |
| 5,661,309 A | 8/1997 | Jeromin et al. | |
| 5,693,948 A | 12/1997 | Sayed et al. | |
| 5,715,292 A | 2/1998 | Sayag et al. | |
| 5,773,832 A | 6/1998 | Sayed et al. | |
| 5,796,109 A * | 8/1998 | Frederick et al. ........... 250/368 |
| 5,811,790 A | 9/1998 | Endo et al. | |
| 5,828,726 A | 10/1998 | Polichar et al. | |
| 5,903,052 A | 5/1999 | Chen et al. | |
| 5,909,478 A | 6/1999 | Polichar et al. | |
| 5,962,856 A | 10/1999 | Zhao et al. | |
| 5,965,872 A | 10/1999 | Endo et al. | |
| 6,049,074 A | 4/2000 | Endo et al. | |
| 6,127,714 A | 10/2000 | Mochizuki | |
| 6,208,708 B1 | 3/2001 | Hoheisel et al. | |
| 6,232,607 B1 | 5/2001 | Huang | |
| 6,239,439 B1 | 5/2001 | Itabashi et al. | |
| 6,255,638 B1 | 7/2001 | Eräluoto et al. | |
| 6,323,891 B1 | 11/2001 | Kitani et al. | |
| 6,331,705 B1 | 12/2001 | Eisen et al. | |
| 6,333,963 B1 | 12/2001 | Kaifu et al. | |
| 6,344,652 B1 | 2/2002 | Shoji | |

(Continued)

FOREIGN PATENT DOCUMENTS

| | | |
|---|---|---|
| JP | 11271454 | 10/1999 |
| JP | 2001099942 | 4/2001 |
| JP | 2001198116 | 7/2001 |
| JP | 2001224579 | 8/2001 |
| JP | 2002006049 | 1/2002 |

(Continued)

*Primary Examiner*—Otilia Gabor
*Assistant Examiner*—Faye Boosalis
(74) *Attorney, Agent, or Firm*—Ziolkowski Patent Solutions Group, SC; Michael A. Della Penna; Carl B. Horton

(57) ABSTRACT

The present invention is a directed to a cover assembly for an x-ray detector that incorporates impact-absorbing material designed to absorb the shock, vibration, stress, and strain placed on the detector when dropped or subjected to a load. The cover assembly may include a layer or inserts of impact-absorbing material. Bumpers of impact-absorbing material may also be secured to the x-ray detector cover. Viscoelastic foam or other plastics may be used as the impact-absorbing material.

26 Claims, 5 Drawing Sheets

U.S. PATENT DOCUMENTS

| | | |
|---|---|---|
| 6,398,409 B1 | 6/2002 | Brooks |
| 6,459,132 B1 | 10/2002 | Mochizuki |
| 6,469,312 B2 | 10/2002 | Agano |
| 6,475,824 B1 | 11/2002 | Kim |
| 6,552,319 B2 | 4/2003 | Pyyhtiä et al. |
| 6,667,480 B2 | 12/2003 | Kajiwara et al. |
| 6,700,126 B2 | 3/2004 | Watanabe |
| 6,707,880 B2 | 3/2004 | Yamayoshi |
| 6,714,623 B2 | 3/2004 | Sako et al. |
| 6,723,592 B2 | 4/2004 | Shih |
| 6,972,410 B2 * | 12/2005 | Takeda ................. 250/370.09 |
| 2002/0005490 A1 | 1/2002 | Watanabe |
| 2002/0011572 A1* | 1/2002 | Kajiwara et al. ...... 250/370.11 |
| 2002/0079458 A1* | 6/2002 | Zur ....................... 250/370.11 |
| 2002/0150214 A1 | 10/2002 | Spahn |
| 2002/0181659 A1 | 12/2002 | Watanabe et al. |
| 2003/0031296 A1 | 2/2003 | Hoheisel |

FOREIGN PATENT DOCUMENTS

| | | |
|---|---|---|
| JP | 2002014170 | 1/2002 |
| JP | 2002048873 | 2/2002 |
| JP | 2002125960 | 5/2002 |
| JP | 2002131437 | 5/2002 |
| JP | 2003000586 | 1/2003 |
| JP | 2003010175 | 1/2003 |
| JP | 2003014862 | 1/2003 |
| JP | 2003060181 | 2/2003 |
| JP | 2003334184 | 11/2003 |

* cited by examiner

X-RAY DETECTOR WITH IMPACT ABSORBING COVER

BACKGROUND OF THE INVENTION

The present invention relates generally to x-ray detectors and, more particularly, to a cover assembly for a digital radiographic x-ray detector capable of absorbing high-energy impacts to inhibit fracturing of the internal components of the x-ray detector.

X-ray imaging is a non-invasive technique to capture images of medical patients for clinical diagnosis as well as inspect the contents of sealed containers, such as luggage, packages, and other parcels. To capture these images, an x-ray source irradiates a scan subject with a fan beam of x-rays. The x-rays are then attenuated as they pass through the scan subject. The degree of attenuation varies across the scan subject as a result of variances in the internal composition of the subject. The attenuated energy impinges upon an x-ray detector designed to convert the attenuating energy to a form usable in image reconstruction. A control system reads out electrical charge stored in the x-ray detector and generates a corresponding image. For a conventional, screen film detector, the image is developed on a film and displayed using a backlight.

Increasingly, flat panel, digital x-ray detectors are being used to acquire data for image reconstruction. Flat panel detectors are generally constructed as having a scintillator which is used to convert x-rays to visible light that can be detected by a photosensitive layer. The photosensitive layer includes an array of photosensitive or detector elements that each store electrical charge in proportion to the light that is individually detected. Generally, each detector element has a light sensitive region and a region comprised of electronics to control the storage and output of electrical charge. The light sensitive region is typically composed of a photoconductor, and electrons are released in the photoconductor when exposed to visible light. During this exposure, charge is collected in each detector element and is stored in a capacitor situated in the electronics region. After exposure, the charge in each detector element is read out using logic controlled electronics.

Each detector element is conventionally controlled using a transistor-based switch. In this regard, the source of the transistor is connected to the capacitor, the drain of the transistor is connected to a readout line, and the gate of the transistor is connected to a scan control interface disposed on the electronics in the detector. When negative voltage is applied to the gate, the switch is driven to an OFF state, i.e. no conduction between the source and drain. On the other hand, when a positive voltage is applied to the gate, the switch is turned ON resulting in connection of the source to the drain. Each detector element of the detector array is constructed with a respective transistor and is controlled in a manner consistent with that described below.

Specifically, during exposure to x-rays, negative voltage is applied to all gate lines resulting in all the transistor switches being driven to or placed in an OFF state. As a result, any charge accumulated during exposure is stored in each detector element capacitor. During read out, positive voltage is sequentially applied to each gate line, one gate at a time. In this regard, only one detector element is read out at a time. A multiplexer may also be used to support read out of the detector elements in a raster fashion. An advantage of sequentially reading out each detector element individually is that the charge from one detector element does not pass through any other detector elements. The output of each detector element is then input to a digitizer that digitizes the acquired signals for subsequent image reconstruction on a per pixel basis. Each pixel of the reconstructed image corresponds to a single detector element of the detector array.

As described above, indirect detection, digital x-ray detectors utilize a layer of scintillating material, such as Cesium iodide (CsI), to convert incident radiation to visible light that is detected by light sensitive regions of individual detector elements of a detector array. Generally, the transistor controlled detector elements are supported on a thin substrate of glass. The substrate, which supports the detector elements as well as the scintillator layer, is supported by a panel support. The support panel is not only designed to support the detector components, but also isolates the electronics for controlling the detector from the detector components. The electronics is supported by the base of a cover assembly enclosing the internal components of the x-ray detector.

The internal components of an x-ray detector, e.g. scintillator layer, detector array, glass substrate, etc., are relatively sensitive components that may fracture when subjected to relatively high levels of strain, stress, and acceleration. As such, when an x-ray detector is dropped, stepped upon, or otherwise exposed to stress or strain, the internal components may be become damaged and degrade detector performance. As a result, the x-ray detector will require repair or replacement—two potentially costly solutions.

Therefore, it would be desirable to design a cover assembly for housing the internal components of an x-ray detector that absorbs the impact when the x-ray detector is exposed to stress and strain such that internal components of the detector are not damaged. It would be further desirable to design such a cover assembly without significant increase in the size and weight of the detector.

BRIEF DESCRIPTION OF THE INVENTION

The present invention is a directed to a cover assembly for an x-ray detector that overcomes the aforementioned drawbacks. The cover assembly incorporates impact-absorbing material that is designed to absorb the shock, vibration, stress, and strain placed on the detector when dropped or subjected to a load. The cover assembly may include a layer, inserts of impact-absorbing material, or both. Bumpers of impact-absorbing material may also be secured to the x-ray detector cover. Viscoelastic foam or other plastics may be used as the impact-absorbing material.

Therefore, in accordance with one aspect of the present invention, an x-ray detector is disclosed as having an x-ray detection layer configured to output electrical signals in response to reception of x-rays. The detector further has a circuit board having a plurality of electronic components disposed thereon and configured to at least control readout of the electrical signals from the x-ray detection layer. A cover assembly encloses the x-ray detection layer and the circuit board. The cover assembly is formed of a first material and incorporates impact-absorbing material different from the first material.

In accordance with another aspect of the present invention, a solid state x-ray detector includes a scintillator layer configured to output light in response to x-ray exposure and an array of photosensitive detector elements supported by a glass substrate and configured to store electrical charge as a function of light output by the scintillator layer during data acquisition, and output electrical signals indicative of the stored electrical charge during readout. The detector further includes a housing enclosing the scintillator layer, the array of photosensitive detector elements, and the glass substrate. Viscoelastic material is secured to the housing to absorb stresses and strains placed on the detector.

According to another aspect, the present invention includes a cover assembly to encase components of an x-ray detector. The cover assembly has a top support panel and a bottom support panel collectively defining an internal volume configured and sized to house components of an x-ray detector. At least one cavity is formed in at least one of the top support panel and the bottom support panel such that impact-absorbing material may be disposed therein. The impact-absorbing material is different from that which the top support panel and the bottom support panel are formed.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to a flat panel, solid-state, indirect detection, portable digital x-ray detector for use with a mobile x-ray imaging system. However, the present invention is equivalently applicable with other types of x-ray detectors including direct detection digital detectors. Additionally, the present invention may be used with stationary or fixed room x-ray imaging systems. Further, the present application makes reference to an imaging "subject" as well as an imaging "object". These terms are not mutually exclusive and, as such, use of the terms is interchangeable and is not intended to limit the scope of the appending claims.

Figure 1:
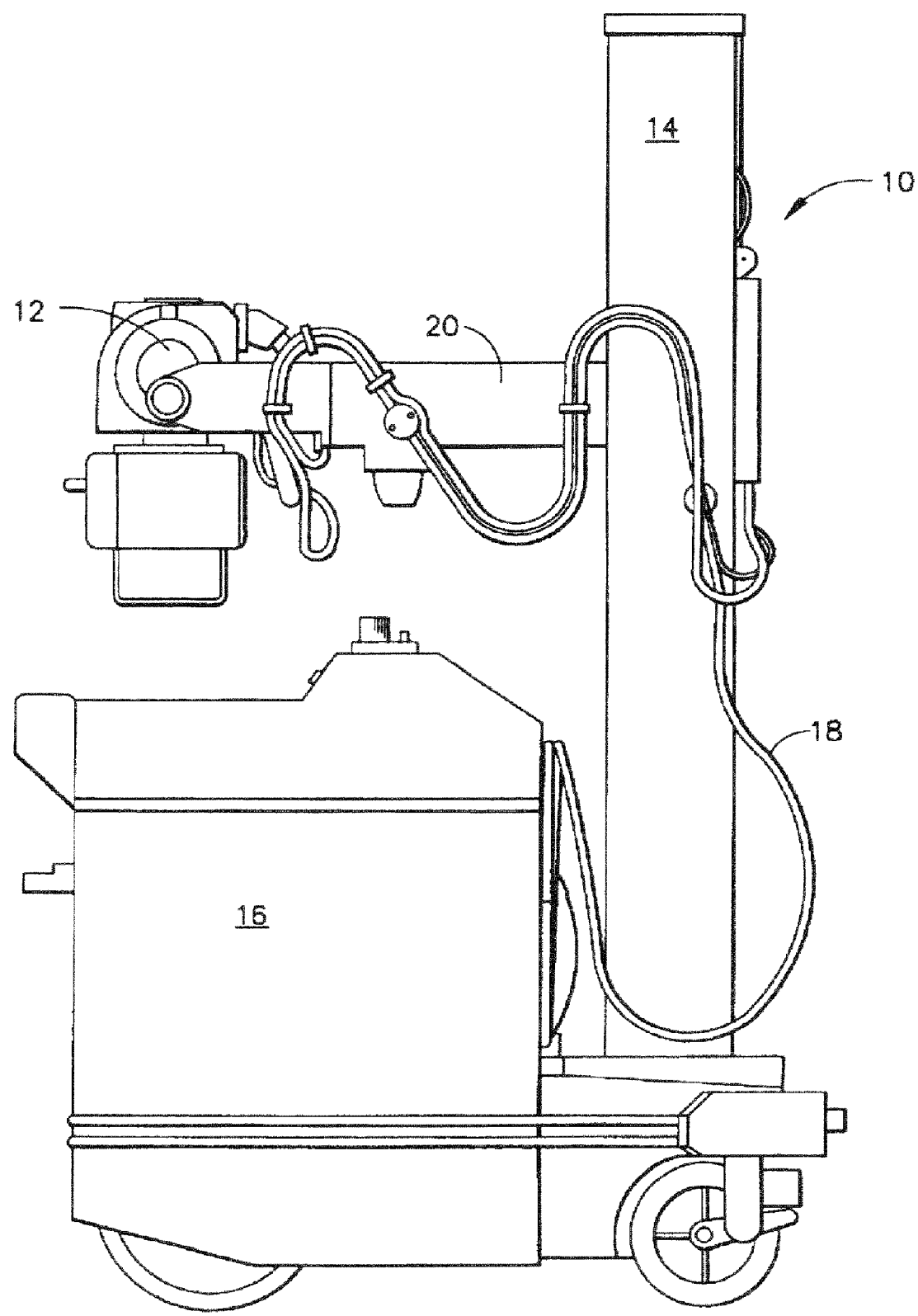
FIG. 1 is a pictorial view of an exemplary mobile x-ray imaging system.

Referring now to FIG. 1, an exemplary mobile x-ray imaging system 10 applicable with a portable x-ray detector incorporating the present invention is shown. An x-ray source 12 is mounted or otherwise secured to an end of horizontal arm 20. Arm 20 allows the x-ray source 12 to be variably positioned above a subject in such a manner so as to optimize irradiation of a particular area of interest. The x-ray source 12 is typically mounted through a gimbal-type arrangement (not shown) in column 14. In this regard, the x-ray source may be rotated vertically from a rest or park position on the mobile x-ray unit base 16 to the appropriate position above the subject in order to take an x-ray exposure of the subject. The rotational movement of column 14 is typically limited to a value of 360 degrees or less to prevent entanglement of high voltage cables 18 used to provide electrical power to the x-ray source 12. Cables 18 may be connected to a utility line source (not shown) or a battery (not shown) in the base 16 to energize the x-ray source 12 as well as other electronic components of the system 10. One skilled in the art will appreciate that system 10 may be equipped or connectable to a display unit (not shown) for the display of images captured from the imaging subject.

Figure 2:
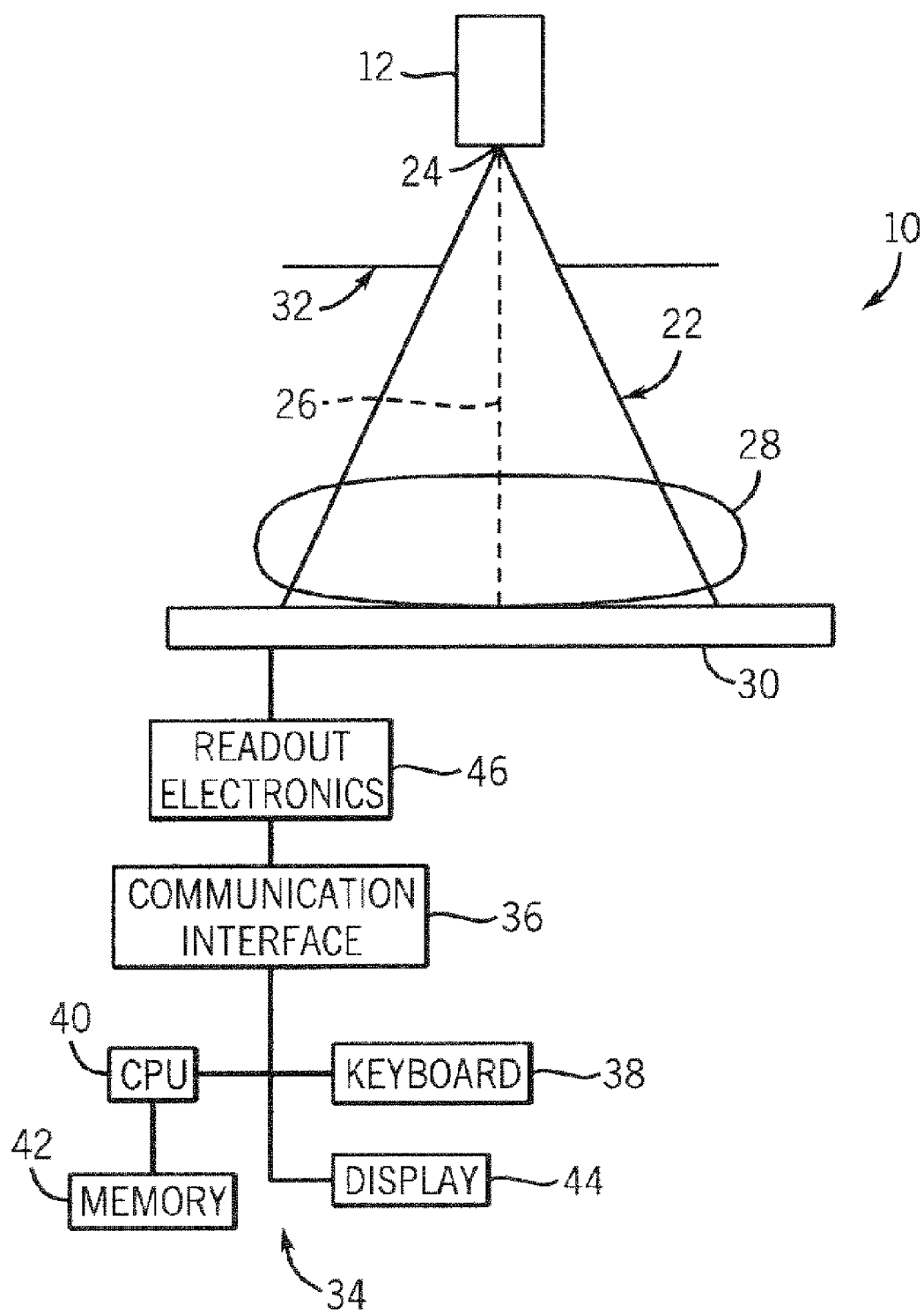
FIG. 2 is a schematic block diagram of the exemplary x-ray imaging system shown in FIG. 1.

Referring now to FIG. 2, a schematic of x-ray imaging system 10 is illustrated. As referenced above, system 10 includes x-ray source 12 designed to project a fan bean of irradiation 22 from focal spot 24 along axis 26 toward an object to be imaged 28. One skilled in the art will appreciate that medical patients as well as luggage, packages, and the like may be non-invasively inspected using the exemplary x-ray imaging system 10. A flat panel digital detector 30 detects x-rays passing through and attenuated by object 28. A collimator assembly 32, schematically shown in FIG. 2 as comprising collimator blades, may be used to collimate the x-ray fan beam 22 to control the scope of irradiation.

A host or scanner interface 34 includes a communication interface 36, a keyboard 38 or other data entry device, a CPU 40, memory 42, and a display unit 44, such a computer monitor, to display reconstructed images of the object. A bus 46 connects the keyboard 38, CPU 40, memory 42, and display unit 44 to the communication interface 36. The CPU may include a microprocessor, digital signal processor, microcontroller, as well as other devices designed to carry out logic and processing operations. Signals corresponding to an x-ray image are read out from flat panel detector 30 via readout electronics 46. While not shown, it is contemplated that the host interface 34 may be connected to a centralized facility via the Internet or communications link for monitoring and maintenance.

Additionally, the readout electronics may read out signals from the flat panel detector across a tethered connection between the detector and the imaging system. It is also contemplated that read out may be achieved across a wireless communication between the detector and imaging system. In this regard, one skilled in the art will appreciate that the imaging system and detector may be equipped with transceivers, antennas, and other operational circuitry to support the wireless transmission of data.

Figure 3:
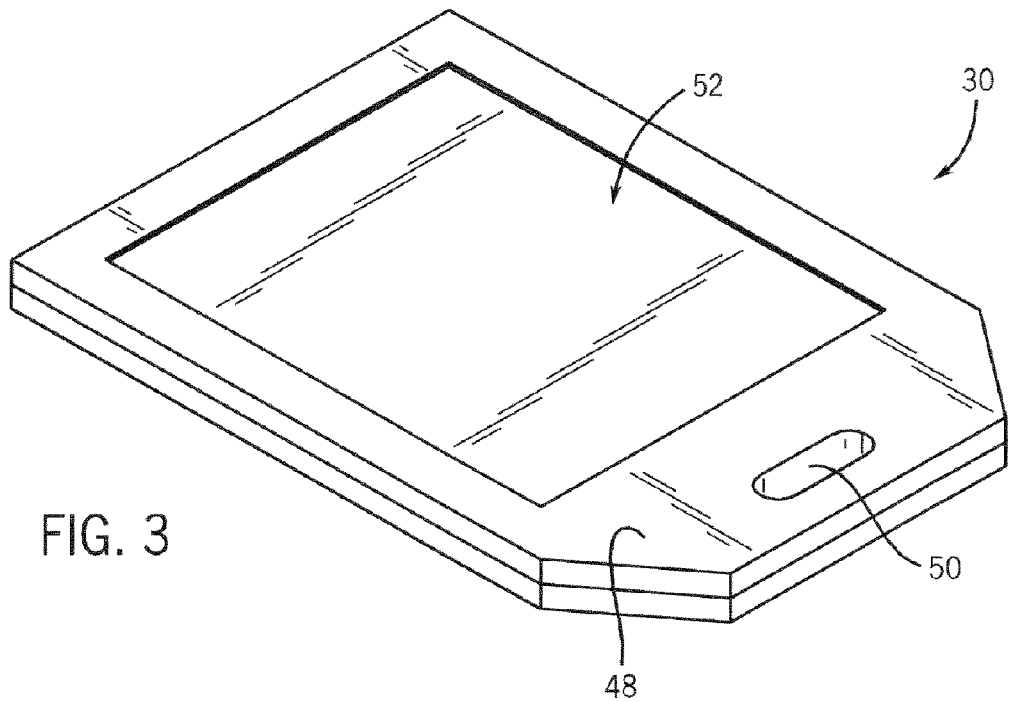
FIG. 3 is a perspective view of a portable, solid-state, flat panel, digital x-ray detector incorporating the present invention.

Referring now to FIG. 3, a perspective view illustrates a portable, flat panel x-ray detector 30 incorporating the present invention. Detector 30 is preferably an indirect detection, solid-state, digital detector that determines x-ray attenuation through an imaging subject from the emission of light by a scintillator that emits light upon the incidence of x-rays. The detector 30 includes a cover 48 formed of lightweight, durable composite material. A handle 50 is incorporated into the cover to support the portability of the detector. As shown, the detector 30 may be constructed without a fixed tether. In this regard, the detector may be connected to a tether (not shown), which is connected to the readout electronics when in use. When not in use, the detector may be easily detached from tether and stored remotely from the imaging system. The top of the cover includes a template 52 that visually defines the surface dimensions of the scintillator layer in the detector. Template 52 is designed to visually assist a user in positioning of the detector for data acquisition.

While the present invention is particularly applicable with indirect detection digital detectors, the present invention may also be implemented with direct detection digital detectors. Direct detection digital detectors utilize a layer of amorphous selenium or similar material photoconductor coupled to a thin film transistor array. X-ray interaction in the selenium layer releases electrons (or electron holes), which are used to form signal directly. An electrode is often used to create an electric field across the selenium layer to minimize the lateral spread of electrons, preserving spatial resolution. In addition to selenium, mercuric iodide, cadmium telluride, and lead iodide may be used.

Figure 4:
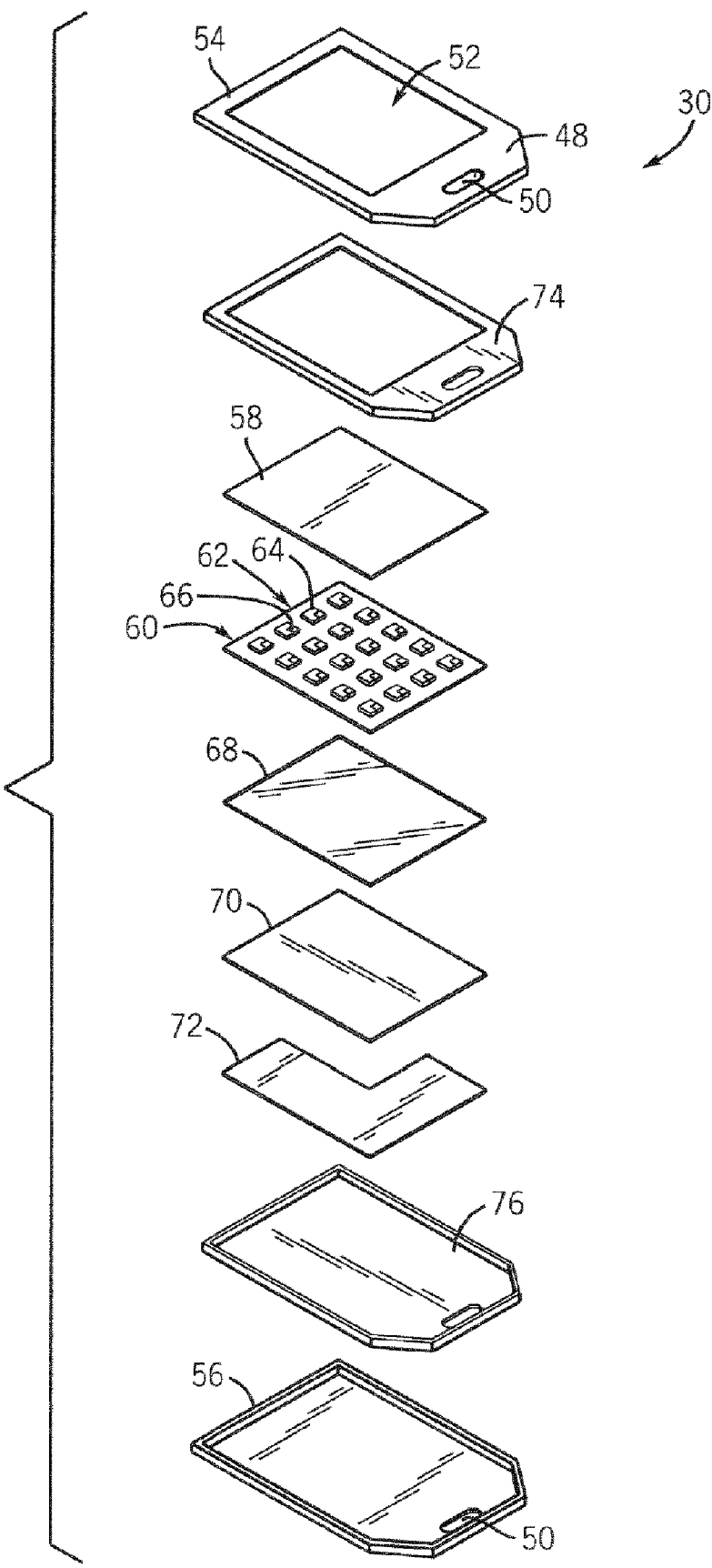
FIG. 4 is an exploded view of the x-ray detector shown in FIG. 3.

Referring now to FIG. 4, an exploded view schematically illustrates the internal composition of detector 30. Detector 30 includes a top cover 54 that along with base cover 56 provides a shell or enclosure for its internal components. Both covers 54, 56 are preferably formed of a composite material, such as carbon graphite, and impact-absorbing material, such as viscoelastic foam, so as to house and protect the detector components from fracture when exposed to a load or dropped. As will be described in greater detail below, covers 54 and 56 may be constructed with bumpers, foam inserts, layers of impact absorbing material, and the like to inhibit fracturing of the detector components when dropped or exposed to a load. When assembled, the top cover 54 is constructed in such a manner that the detector may be placed on a floor and support a standing subject. In this regard, the top cover panel 54 is designed to minimally deflect when subjected to a load.

Top cover 54 and base cover 56 collectively form handle 50 when assembled. The handle supports portability of the detector. Additionally, the detector is constructed to be quickly detached from a tether (not shown) that is used to connect the detector to the scanner during data acquisition and readout. As such, detector 30 may be transported to and from multiple scan stations remote from one another. This is particularly advantageous for emergency rooms and other triage facilities. Further, the portability and detachability of the detector further enhances the mobility of a mobile x-ray imaging system, such as that shown in FIG. 1.

Detector 30 further includes a scintillator layer 58 designed to convert incident x-rays or gamma rays to visible light. Scintillator layer 58, which may be fabricated from CsI or other scintillating material, is designed to emit light proportional to the number and energy of the x-rays received. As such, light emissions will be higher in those regions of the scintillator layer 58 where either more x-rays were received or the energy level of the received x-rays was higher. Since the composition of the subject will attenuate the x-rays projected by the x-ray tube, the energy level of the x-rays impinging upon the scintillator layer will not be uniform across the scintillator layer. This variation in light emission will be used to capture contrast in the reconstructed image.

The light emitted by the scintillator layer 58 is detected by detector elements of a detector element array 60. Each detector element 62 corresponds to a picture element or pixel in the reconstructed image. Each detector element 62 includes a light sensitive or photoconductive region 64 and an electronics region 66. During exposure to x-rays, electrons are released in the light sensitive region 64 in proportion to the light detected in the region 64. The electronics region 66 includes a capacitor (not shown) that stores the electrical charge accumulated by the light sensitive region. After exposure, a thin-film-transistor (not shown) in the electronics region 66 is biased so as to connect the capacitor to readout electronics in the x-ray scanner. Generally, a multiplexer (not shown) is used to control read out of the discrete detector elements in a sequential, raster fashion. In this regard, the output of each detector element is sequentially input to a digitizer for digitization for subsequent image reconstruction.

The thin-film-transistors of the detector elements 62 are supported by a glass substrate 68. Lead lines (not shown) etched in substrate 68 are used for routing of the electrical output of the detector elements as well as applying the biasing voltages to the thin-film-transistors. The glass substrate is generally very thin and fragile. In this regard, as referenced above, the top cover and base cover 54 and 56 are designed with impact absorbing material to help prevent fracturing of the glass substrate. Additionally, as the detector 30 may be used to support a relatively large load during imaging, e.g. imaging of the feet of an average sized adult male, the top cover panel 54 is further designed to reduce the stress on the detector to further prevent fracturing of the glass substrate and other detector components.

The glass substrate 68 is supported by a detector panel support 70. Panel support 70 is not only designed to support substrate 68, but is also used to separate the x-ray conversion and light detection components from the electronics 72. Panel support 70 is constructed to include radiation absorbing material in addition to structurally supporting material. Incorporating radiation absorbing material within the panel support reduces or eliminates the detection of backscattered x-rays. That is, the radiation absorbing material absorbs x-rays passing through the scintillator layer, detector element array, and glass substrate, as well as x-rays that deflect off the back cover of the detector. In this regard, the electronics 72 are not imaged.

Electronics 72, in one embodiment, have an L-shape and is disposed to support the processing and logic control electronics of the detector. The electronics preferably includes LEDs for monitoring operation and diagnostics of the detector. The motherboard may also include temperature sensors for providing feedback as to the temperature of the detector as well as the temperature of the subject. The electronics may also support an accelerometer designed to detect acceleration of the detector and store data accordingly. In this regard, the accelerometer may be used to record the date and time when the detector experienced dramatic increases in acceleration, i.e. when dropped. The electronics may also include various storage devices including flash storage. In a wireless implementation, the motherboard may include an antenna and transceiver for wirelessly transmitting data to the x-ray scanner. Additionally, the electronics may include a battery or other DC power source for powering the detector electronics. The electronics are supported by base cover panel 56.

As described above, the x-ray detector is designed to withstand relatively high-energy impacts, stresses, and strains such that the relatively sensitive components, i.e. scintillator layer, detector element array, glass substrate, and motherboard, are not damaged when the detector is dropped or stepped upon. In this regard, in one embodiment, the x-ray detector 30 includes two layers of impact-absorbing material 74, 76. One layer 74 is sealed against or otherwise placed in proximity to the undersurface of top cover panel 54 so as to be sandwiched between the top cover panel and scintillator layer 58. The other layer 76 is sealed or otherwise placed in proximity to the top surface of base panel 56 so as to be sandwiched between motherboard 72 and base panel 56. While two impact-absorbing layers 74, 76 are shown, it is contemplated that the detector may include only a single layer which is preferably sealed against the undersurface of top cover panel 54 or multiple layers interstitially disposed between the detector components. In this regard, the impact-absorbing material is designed not to attenuate radiation and, as such, does not interfere with data acquisition.

The impact-absorbing material is preferably a viscoelastic material that is designed to absorb the shock and vibrations placed on the detector when dropped but also deflect the force placed on the detector when stepped upon or otherwise subjected to a load, e.g. a standing patient for a foot/feet scan. In this regard, the impact absorbing material will deform when subjected to a load, but also recover its shape when the load is removed. As such, the impact-absorbing material has a memory.

The viscoelastic material, which may be foam or other plastic, is designed to deflect and absorb stresses and strains on the detector. As such, when the detector is stepped upon or dropped, the internal components of the detector, e.g. scintillator layer, detector element array, glass substrate, and motherboard, do not fracture or are otherwise damaged. One skilled in the art will appreciate that the thickness, density and composition of the impact-absorbing material may be variably selected to define the limits by which the detector may be subjected to a load or dropped without damage to the detector components. Preferably, however, the detector should have sufficient impact absorbing material such that the damage does not result when the detector is dropped a distance of 20 cm. and/or subjected to a point-load of 370 lbs.

Further, it is contemplated that layers 74 and 76 can have similar or dissimilar thicknesses, and be composed of similar or dissimilar impact absorbing material(s). For example, layer 74 may be designed to be more absorbent and deflective than layer 76. In this regard, layer 74 may be thicker than layer 76 or formed from material with improved absorption and deflective characteristics. Additionally, layer 74 may be formed of foam having pronounced viscoelastic properties whereas layer 76 is formed of a polycarbonate, PVC, or other material with less pronounced viscoelastic characteristics.

Figure 5:
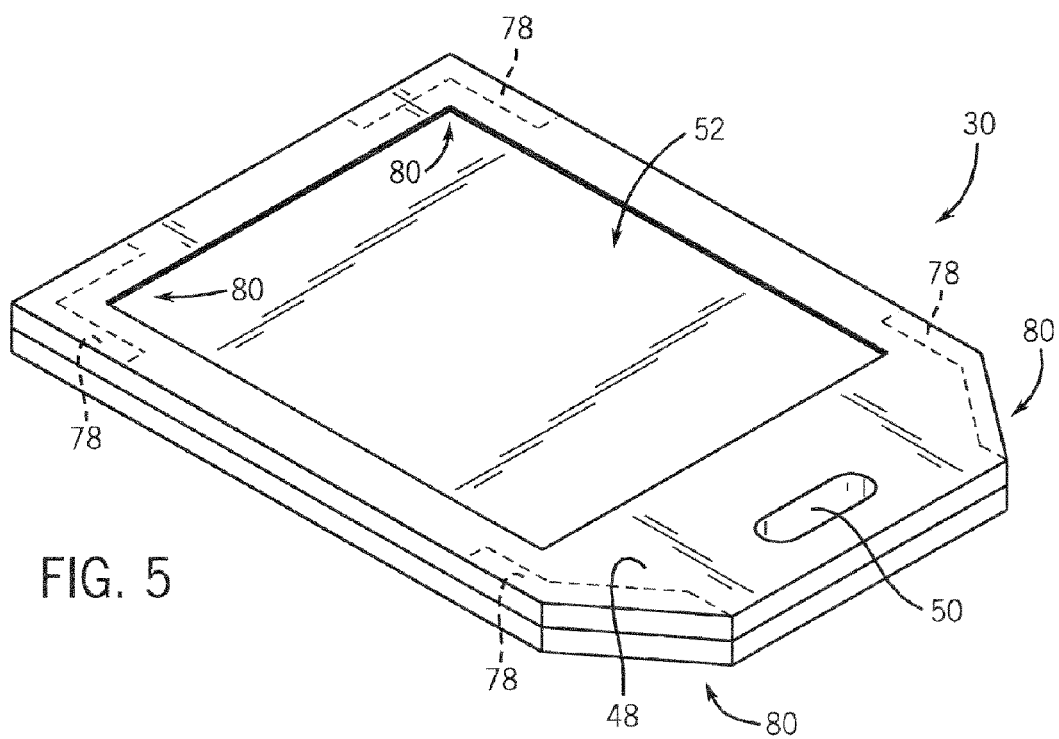
FIG. 5 is a perspective view of a portable, solid-state, flat panel, digital x-ray detector according to another embodiment of the present invention.

Referring now to FIG. 5, it is contemplated that the x-ray detector 30 may be constructed to have impact-absorbing inserts 78 placed in cavities positioned internally about the perimeter of the x-ray detector cover 48. The inserts may be positioned internally about the entire perimeter of the detector cover or, as illustrated in FIG. 5, positioned at identified impact zones 80. For example, inserts 78 may be positioned at each corner of the detector 30. Accordingly, when dropped, the detector is more likely to impact a floor or other surface at a corner. It is recognized that the detector may be constructed that its weight distribution increases the likelihood that that detector will impact the floor or other surface at a corner when dropped. By incorporating impact-absorbing material at the corners of the cover 48, the shock and resulting vibrations of the drop incident may be absorbed by the insert 78 and prevented from transferring to the internal components of the detector. It is recognized that the entirety of the shock may not be absorbed or otherwise deflected, but a sufficient percentage of the shock is absorbed such that any shock or vibration experienced by the internal components is of a magnitude insufficient to cause damage to the internal components. Additionally, by incorporating the inserts internally within the detector, the overall size and weight of the detector is negligibly increased, if any.

It is contemplated that the inserts 78 may be used in conjunction with a layer of impact-absorbing material positioned between the top cover and base panels and the internal components of the detector, such as that shown and described with respect to FIG. 4. In this regard, the layers of impact-absorbing material may be fabricated from materials with better deflective properties than impact absorption properties. On the other hand, the inserts 78 may be fabricated from materials having better impact absorption properties than deflective properties. As a result of this construction, the detector is able to handle greater point loads and greater impacts than that achieved with inserts or layers of impact absorbing material alone.

Figure 6:
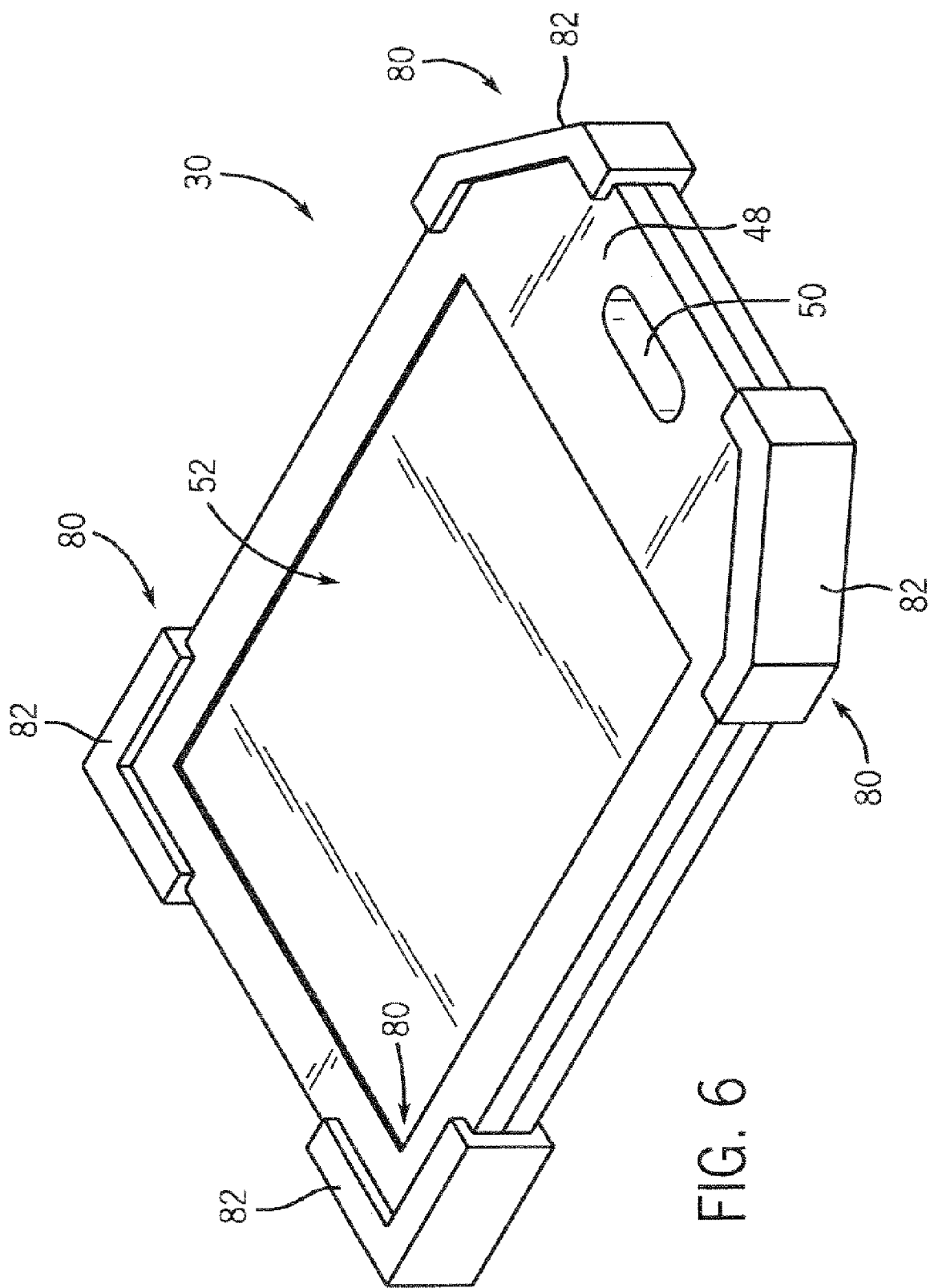
FIG. 6 is a perspective view of a portable, solid-state, flat panel, digital x-ray detector according to yet another embodiment of the present invention.

It is also contemplated that "bumpers" of impact-absorbing material may be secured, sealed, or otherwise connected to the external perimeter of the x-ray detector cover. This embodiment is illustrated in FIG. 6. As shown, bumpers 82 of impact absorbing material may be sealed against one or more corners of the detector cover 48. As the corners are identified as impact zones, the bumpers are shown at each corner. It is recognized that other impact zones may be identified around the perimeter of the cover 48 and, as such, receive a bumper. In this regard, it is contemplated that a continuous bumper may be sealed against the entire perimeter of the cover 48. In contrast to the embodiments described with respect to FIGS. 4 and 5, the bumpers 82 shown in FIG. 6 may increase the size of the detector. On the other hand, it is contemplated that the corners of the cover 48 may be replaced with bumpers 82 so as to not increase the size of the detector.

For instance, the cover 48 may be molded in such a manner that impact-absorbing material is used at the corners rather than the composite material used throughout the remainder of the cover. Or, cover 48 may be initially constructed without corners whereupon properly shaped wedges of impact-absorbing material may be glued or otherwise sealed to the cover so as to fill in the voids defined at the corners. Further, similar to the embodiment illustrated in FIG. 5, the detector of FIG. 6 may be constructed to include impact-absorbing material at selected impact zones as well as layers of impact-absorbing material such as that shown in FIG. 4.

Therefore, an x-ray detector is disclosed as having an x-ray detection layer configured to output electrical signals in response to reception of x-rays. The detector further has a circuit board having a plurality of electronic components disposed thereon and configured to at least control readout of the electrical signals from the x-ray detection layer. A cover assembly encloses the x-ray detection layer and the circuit board. The cover assembly is formed of a first material and incorporates impact-absorbing material different from the first material.

A solid state x-ray detector is also disclosed and includes a scintillator layer configured to output light in response to x-ray exposure and an array of photosensitive detector elements supported by a glass substrate and configured to store electrical charge as a function of light output by the scintillator layer during data acquisition, and output electrical signals indicative of the stored electrical charge during readout. The detector further includes a housing enclosing the scintillator layer, the array of photosensitive detector elements, and the glass substrate. Viscoelastic material is secured to the housing to absorb stresses and strains placed on the detector.

The present invention is also directed to a cover assembly that encases components of an x-ray detector. The cover assembly has a top support panel and a bottom support panel collectively defining an internal volume configured and sized to house components of an x-ray detector. At least one cavity is formed in at least one of the top support panel and the bottom support panel such that impact-absorbing material may be disposed therein. The impact-absorbing material is different from that which the top support panel and the bottom support panel are formed.

The present invention has been described in terms of the preferred embodiment, and it is recognized that equivalents, alternatives, and modifications, aside from those expressly stated, are possible and within the scope of the appending claims.

What is claimed is:

1. An x-ray detector comprising:
    an x-ray detection layer configured to output electrical signals in response to reception of x-rays;
    a circuit board having a plurality of electronic components disposed thereon and configured to at least control readout of the electrical signals from the x-ray detection layer;
    a cover assembly enclosing the x-ray detection layer and the circuit board, the cover assembly formed of a first material and incorporating viscoelastic impact-absorbing material different from the first material; and
    one or more bumpers formed of the viscoelastic impact-absorbing material and substantially confined to respective identified prospective impact corners of an external perimeter of the cover assembly.

2. The x-ray detector of claim 1 wherein the cover assembly includes a handle to support portability thereof.

3. The x-ray detector of claim 1 wherein the one or more bumpers are secured to the external perimeter of the cover assembly.

4. The x-ray detector of claim 3, wherein the one or more bumpers formed of the viscoelastic impact-absorbing material comprise four or more bumpers formed of the viscoelastic impact-absorbing material;
    wherein the cover assembly includes four corners, and having a respective bumper of the four or more bumpers overlapping each corner of the cover assembly.

5. The x-ray detector of claim 1 wherein the viscoelastic material includes foam.

6. The x-ray detector of claim 1 wherein the x-ray detection layer includes a scintillator layer and a photosensitive layer configured to detect illumination of the scintillator layer.

7. The x-ray detector of claim 6 further comprising a glass substrate having transistors etched thereon and configured to control operation of the photosensitive layer between a data acquisition state and a readout state.

8. The x-ray detector of claim 1 configured as a flat-panel, solid state x-ray ray detector.

9. The x-ray detector of claim 1, wherein the cover assembly and one of the bumpers comprise a unitary structural construction that transitions from a complete composition of the first material at an intermediate location to a complete composition of the viscoelastic impact-absorbing material at the respective one of the identified discrete prospective impact zone of the external perimeter of the cover assembly, wherein the unitary structural construction maintains a substantially consistent profile in enclosure of the x-ray detection layer and the circuit board.

10. The x-ray detector of claim 1, wherein the cover assembly comprises a panel, wherein the viscoelastic impact-absorbing material comprises a transverse layer of the cover assembly that is substantially coextensive with an expanse of a major dimension of the panel.

11. A solid state x-ray detector comprising:
    a scintillator layer configured to output light in response to x-ray exposure;
    an array of photosensitive detector elements supported by a glass substrate and configured to store electrical charge as a function of light output by the scintillator layer during data acquisition and output electrical signals indicative of the stored electrical charge during readout;
    a housing enclosing the scintillator layer, the array of photosensitive detector elements, and the glass substrate; and
    viscoelastic material secured externally to the housing and confined to respective identified prospective impact corners of a periphery of the housing.

12. The solid state x-ray detector of claim 11 wherein the housing includes an insert of viscoelastic material positioned at each corner thereof in the one or more cavities.

13. The solid state x-ray detector of claim 11 further comprising a transverse layer of viscoelastic material sandwiched between the scintillator layer and an undersurface of a top panel of the housing and substantially coextensive with an expanse of a major dimension of the top panel of the housing.

14. The solid state x-ray detector of claim 11 wherein the viscoelastic material is formed of a material sufficient to prevent fracturing of at least one of the scintillator layer, the array of photosensitive detector elements, and the glass substrate when dropped a distance of 20 cm.

15. The solid state x-ray detector of claim 11 further comprising a handle incorporated into the housing to support portability thereof.

16. The solid state x-ray detector of claim 11 wherein the viscoelastic material includes foam.

17. The solid state x-ray detector of claim 11 further comprising an insert of viscoelastic material at one or more corners of the housing.

18. The solid state x-ray detector of claim 11, wherein the scintillator layer, the array of photosensitive detector elements, and the glass substrate may be constructed that an effective weight distribution increases a likelihood of impact on a floor or other surface at a corner of the housing when dropped;
    wherein incorporation of the viscoelastic material at corners of the housing serves to absorb a sufficient percentage of shock and resulting vibrations of a drop incident such that any shock or vibration experienced by components of the scintillator layer, the array of photosensitive detector elements, and/or the glass substrate is of a magnitude insufficient to cause damage thereto.

19. A cover assembly to encase components of an x-ray detector, the cover assembly comprising:
    a top support panel and a bottom support panel collectively defining an internal volume configured and sized to house components of an x-ray detector;
    at least one substantially transverse cavity formed in at least one of the top support panel and the bottom support panel;
    viscoelastic impact-absorbing material that comprises a first impact-absorbing material portion disposed in the at least one substantially transverse cavity, the viscoelastic impact-absorbing material different from that which the top support panel and the bottom support panel are formed;
    at least one corner cavity substantially confined to a respective corner of the at least one of the top support panel and the bottom support panel; and a second impact-absorbing material portion of the viscoelastic impact-absorbing material disposed in the at least one corner cavity;

wherein the first impact-absorbing material portion comprises a transverse layer of the cover assembly that is substantially coextensive with an expanse of a major dimension of a corresponding one of the top support panel or the bottom support panel that comprises a respective substantially transverse cavity of the at least one substantially transverse cavity.

20. The cover assembly of claim 19, wherein each corner of the at least one of the top support panel and the bottom support panel comprises a respective impact-absorbing material portion of the viscoelastic impact-absorbing material disposed therein.

21. The cover assembly of claim 19 wherein the viscoelastic material includes foam.

22. The cover assembly of claim 19 further comprising a handle defined in the top support panel and the bottom support panel.

23. The cover assembly of claim 19 wherein the top support panel and the bottom support panel are comprised of carbon graphite.

24. The cover assembly of claim 19 configured to prevent fracturing of a glass substrate housed in the internal volume when subjected to a point-load of 370 pounds.

25. The cover assembly of claim 19, wherein the transverse layer of the cover assembly comprises a first transverse layer of the cover assembly, wherein the first transverse layer of the cover assembly is substantially coextensive with an expanse of a major dimension of the top support panel that comprises the respective substantially transverse cavity of the at least one substantially transverse cavity;

wherein the viscoelastic impact-absorbing material comprises a second transverse layer of the cover assembly that is substantially coextensive with an expanse of a major dimension of the bottom support panel that comprises a respective substantially transverse cavity of the at least one substantially transverse cavity.

26. A solid state x-ray detector comprising:

a scintillator layer configured to output light in response to x-ray exposure;

an array of photosensitive detector elements supported by a glass substrate and configured to store electrical charge as a function of light output by the scintillator layer during data acquisition and output electrical signals indicative of the stored electrical charge during readout;

a housing enclosing the scintillator layer, the array of photosensitive detector elements, and the glass substrate;

viscoelastic material secured to the housing and located in the one or more discrete cavities substantially confined to respective identified prospective impact corners of a periphery of the housing; and a transverse layer of viscoelastic material sandwiched between the scintillator layer and an undersurface of a top panel of the housing and substantially coextensive with an expanse of a major dimension of the top panel of the housing.

* * * * *